United States Patent
Torgerud et al.

(10) Patent No.: US 8,651,068 B1
(45) Date of Patent: *Feb. 18, 2014

(54) SYSTEMS AND DEVICES FOR SEPARATING WATER AND CONTAMINANTS FROM FUEL

(71) Applicant: Brunswick Corporation, Lake Forest, IL (US)

(72) Inventors: Michael A. Torgerud, Mt. Calvary, WI (US); Gregory L. Fugar, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,012

(22) Filed: Sep. 13, 2013

Related U.S. Application Data (63) Continuation of application No. 13/193,310, filed on Jul. 28, 2011, now Pat. No. 8,590,493.

(51) Int. Cl.
*F02B 47/02* (2006.01)
*F01M 11/03* (2006.01)

(52) U.S. Cl.
USPC ..................................... 123/25 J; 123/196 A (58) Field of Classification Search
CPC ............................ F02M 37/221; F02M 37/22
USPC ..... 123/25 J, 196 A, 510, 461, 495; 220/562; 114/55.5; 210/94, 172.1–172.6, DIG. 6
See application file for complete search history.

(56) References Cited

U.S. PATENT DOCUMENTS

| | | | |
|---|---|---|---|
| 3,187,895 A * | 6/1965 | Pall et al. ...................... | 210/114 |
| 3,626,974 A | 12/1971 | Garrison | |
| 3,716,053 A | 2/1973 | Almovist et al. | |
| 3,779,224 A | 12/1973 | Tagawa et al. | |
| 3,887,104 A | 6/1975 | Cole | |
| 4,420,392 A | 12/1983 | Harris | |
| 4,795,556 A | 1/1989 | Brotea et al. | |
| 4,979,482 A | 12/1990 | Bartlett | |
| 5,209,210 A | 5/1993 | Ikeda et al. | |
| 5,343,858 A | 9/1994 | Winefordner et al. | |
| 5,360,000 A | 11/1994 | Carter | |
| 5,666,945 A | 9/1997 | Davenport | |
| 5,787,882 A | 8/1998 | Hamilton | |
| 5,839,436 A | 11/1998 | Fangrow, Jr. et al. | |
| 5,970,977 A | 10/1999 | Sattelberg | |
| 5,993,675 A | 11/1999 | Hagerthy | |
| 6,019,890 A | 2/2000 | Janik et al. | |
| 6,068,163 A | 5/2000 | Kihm | |
| 6,213,083 B1 | 4/2001 | Winberg | |
| 6,237,645 B1 | 5/2001 | Pountney | |
| 6,260,544 B1 | 7/2001 | Spry et al. | |
| 6,532,888 B1 | 3/2003 | Enik | |

(Continued)

*Primary Examiner* — Mahmoud Gimie
(74) *Attorney, Agent, or Firm* — Andrus Intellectual Property Law, LLP (57) ABSTRACT

A device is for separating water and contaminants from fuel that is being supplied from an upstream fuel reservoir to a downstream internal combustion engine. The device comprises a housing configured to couple with the upstream fuel reservoir, the housing having an inlet receiving fuel, water and contaminants, and an outlet discharging the fuel; a gravity separator disposed in the housing between the inlet and the outlet, the gravity separator separating the water from the fuel; and a filter disposed in the housing between the inlet and the outlet, the filter filtering the contaminants from the fuel.

20 Claims, 8 Drawing Sheets

(56) References Cited

U.S. PATENT DOCUMENTS

| | | |
|---|---|---|
| 6,557,719 B1 | 5/2003 | Arnal et al. |
| 6,681,789 B1 | 1/2004 | Moulis et al. |
| 6,929,039 B2 | 8/2005 | Vaitses |
| 6,935,264 B2 | 8/2005 | Harris |
| 6,935,267 B1 | 8/2005 | Cotton |
| 7,040,320 B2 | 5/2006 | Fjeld et al. |
| 7,044,327 B2 | 5/2006 | Vaitses |
| 7,069,915 B2 | 7/2006 | Brandenburg et al. |
| 7,111,625 B2 | 9/2006 | Jackson |
| 7,225,826 B2 | 6/2007 | Riviezzo |
| 7,240,809 B2 | 7/2007 | Godfrey |
| 7,331,345 B2 | 2/2008 | Haston |
| 7,353,807 B2 | 4/2008 | Paluszewski |
| 7,380,542 B1 | 6/2008 | Herrington |
| 7,416,087 B2 | 8/2008 | Press |
| 7,731,845 B2 * | 6/2010 | Lampert et al. ............... 210/232 |
| 8,356,618 B1 | 1/2013 | Werner |
| 2006/0086649 A1 | 4/2006 | Wieczorek et al. |

\* cited by examiner

SYSTEMS AND DEVICES FOR SEPARATING WATER AND CONTAMINANTS FROM FUEL

CROSS-REFERENCE TO RELATED APPLICATION

The present application is a continuation of co-pending U.S. patent application Ser. No. 13/193,310, filed Jul. 28, 2011, which application is incorporated herein by reference.

FIELD

The present disclosure relates to fuel systems and more particularly to fuel systems that utilize portable marine fuel tanks.

BACKGROUND

U.S. patent application Ser. No. 12/499,545, the disclosure of which is incorporated herein in entirety by reference, discloses a fuel system for an engine that controls the status of an output conduit or passage to open or close the outlet passage as a function of the relative pressure magnitudes of an inlet passage to the engine and atmospheric pressure. An actuator moves in response to this relative pressure condition in the inlet conduit to control the flow of fuel from a cavity of a fuel reservoir through an outlet passage of the fuel reservoir toward the inlet passage of the engine. As a result, fuel demanded by the engine is provided from the cavity of the fuel reservoir as needed while maintaining the sealed condition of the fuel reservoir when fuel is not demanded at the inlet passage of the engine.

SUMMARY

The present disclosure arose during the present inventor's research and development of fuel systems and more particularly to fuel systems that utilize portable marine fuel tanks. During research and development, the inventors have recognized that contamination and water within fuel systems are significant contributors to component failure. Current filtration devices typically require relatively expensive quick connect fittings and can also limit fuel hose portability when the portable fuel tank is removed from the marine vessel for filling. Known water separation devices that are mounted at or near the internal combustion engine have been found by the inventors to decrease hot fuel handling performance of the engine. Upon recognition of these problems in the prior art, the present invention was conceived and reduced to practice.

In one example, a device is for separating water and contaminants from fuel that is being supplied from an upstream fuel reservoir to a downstream internal combustion engine. The device comprises a housing configured to couple with the fuel reservoir, the housing having an inlet receiving fuel, water and contaminants, and an outlet discharging the fuel; a gravity separator disposed in the housing between the inlet and the outlet, the gravity separator separating the water from the fuel; and a filter disposed in the housing between the inlet and the outlet, the filter filtering the contaminants from the fuel.

In another example, a fuel supply system comprises: a fuel reservoir containing fuel; an internal combustion engine consuming fuel from the fuel reservoir; a device attached to the fuel reservoir and separating water and contaminants from the fuel, the device comprising a housing having an inlet receiving fuel and an outlet discharging the fuel; a gravity separator disposed in the housing between the inlet and the outlet, the gravity separator separating water from the fuel; and a filter disposed in the housing between the inlet and the outlet, the filter filtering contaminants from the fuel.

In yet another example, a fuel supply system comprises: a portable fuel reservoir containing fuel; an internal combustion engine consuming fuel from the fuel reservoir; a device separating water and contaminants from the fuel, the device comprising a housing having an inlet receiving fuel and an outlet discharging the fuel; a gravity separator disposed in the housing between the inlet and the outlet, the gravity separator separating water from the fuel; and a filter disposed in the housing between the inlet and the outlet, the filter filtering contaminants from the fuel. In this example, the housing comprises a water cavity for holding the water separated from the fuel and a fuel supply cavity for supplying fuel to the outlet. The gravity separator comprises a baffle disposed between the water cavity and the fuel supply cavity such that the fuel and water separate by gravity as the fuel passes over the baffle from upstream to downstream. A drain discharges water from the water cavity and a valve is movable between a sealed position for closing the drain and an unsealed position for opening the drain. The valve comprises a fitting that coextends with the outlet and a seal sealing between the fitting and the housing. Optionally the device comprises a primer priming fuel from the fuel reservoir to the internal combustion engine.

Further examples are disclosed herein with reference to the following drawing figures.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different devices and systems described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
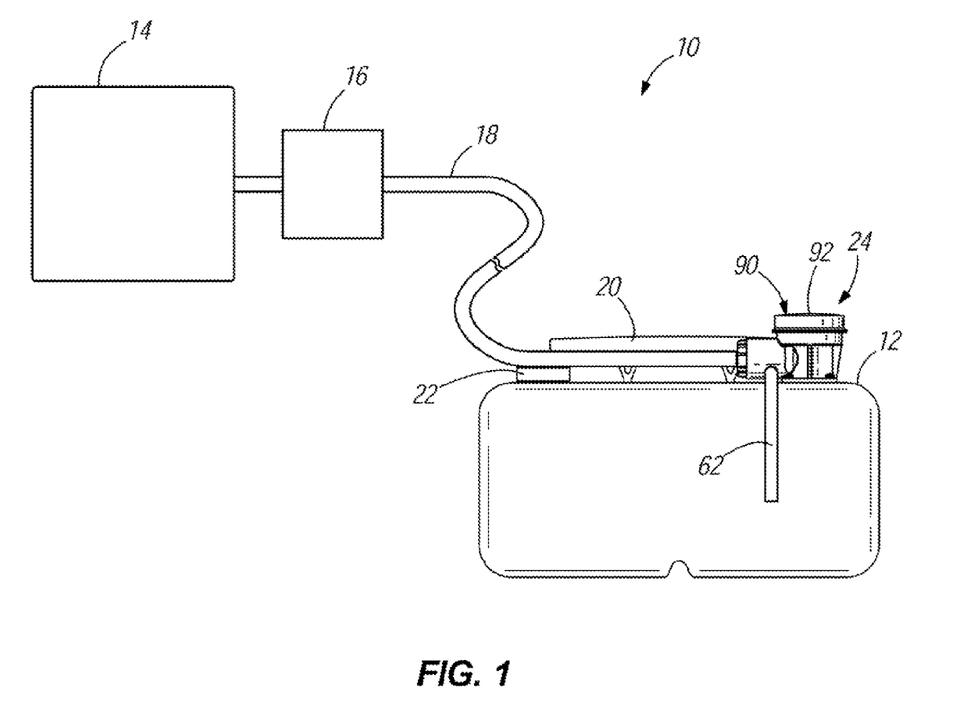
FIG. 1 is a partially schematic view of a fuel supply system.

FIG. 1 depicts a fuel supply system 10 that includes a fuel reservoir 12 containing fuel, an internal combustion engine 14 consuming fuel from the fuel reservoir 12 and a pump 16 drawing fuel from the fuel reservoir 12 though a fuel hose 18 and pumping the fuel into the internal combustion engine 14 for consumption therein. A handle 20 is provided on the fuel reservoir 12 to enable manual portability of the fuel reservoir 12. An inlet port 22 is provided on the fuel reservoir 12 for filling with fuel by conventional means.

Figure 2:
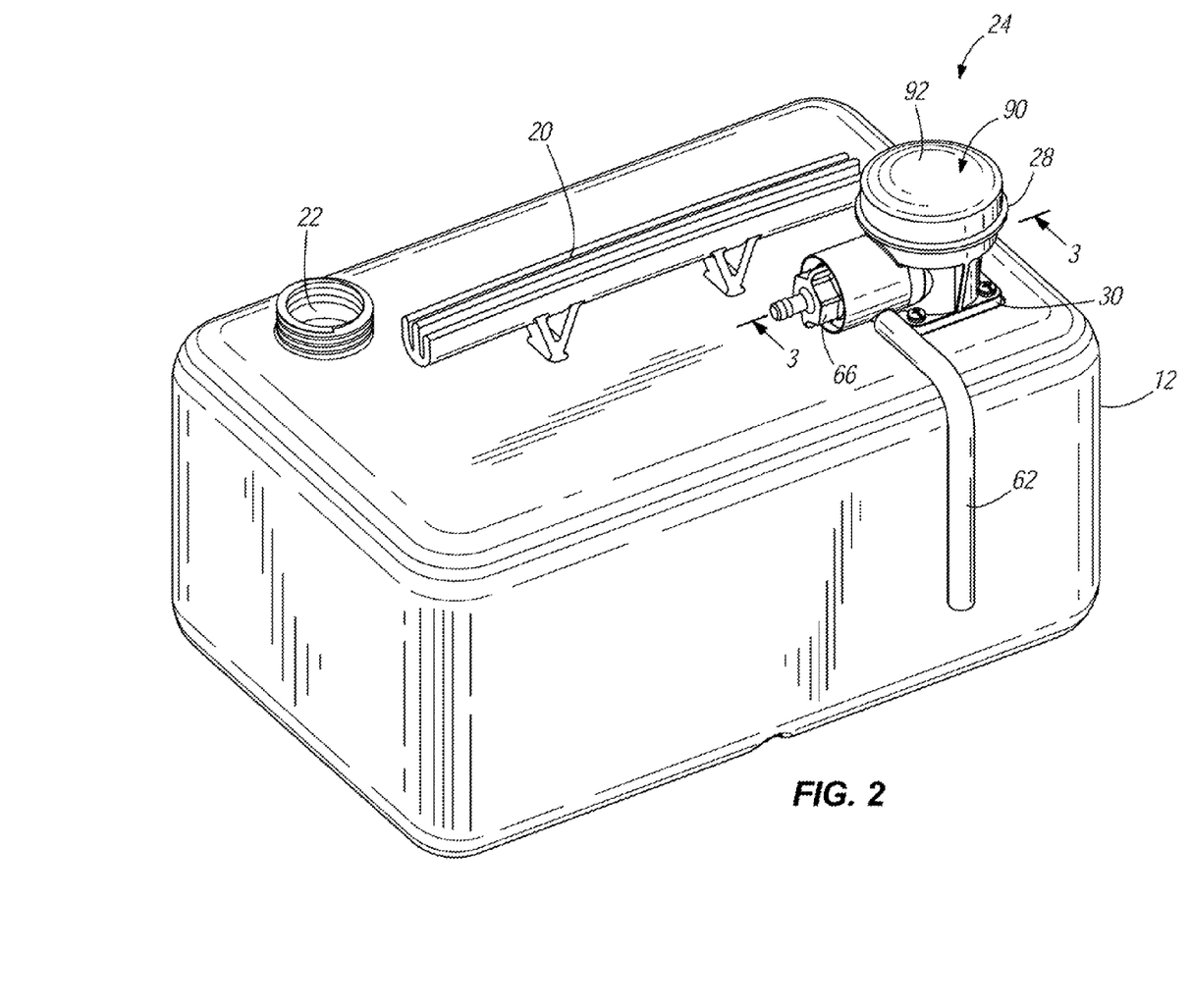
FIG. 2 is a perspective view of a portable fuel reservoir.
Figure 3:
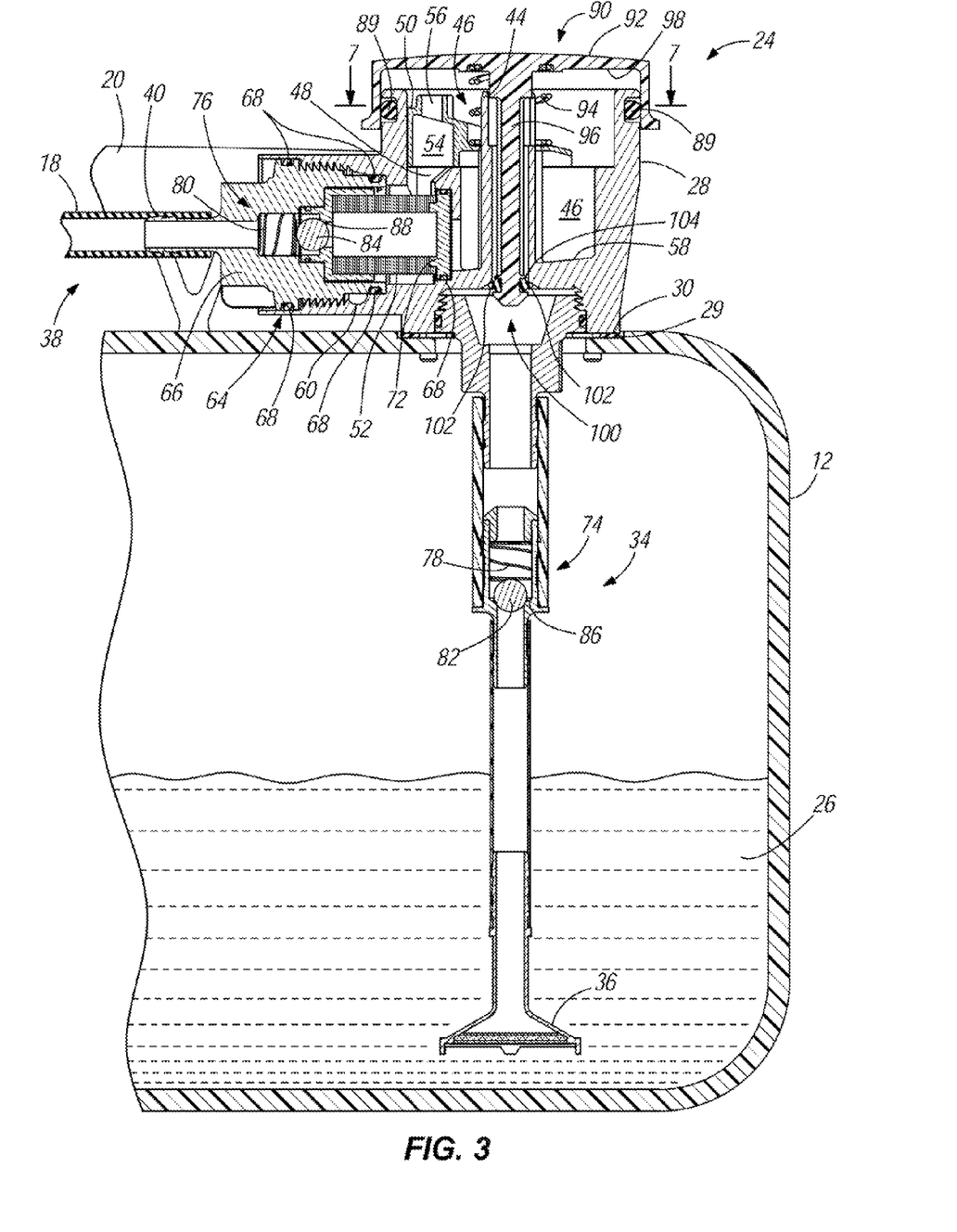
FIG. 3 is a view of section 3-3 taken in FIG. 2.

As shown in FIGS. 2 and 3, a device 24 is provided for separating water and contaminants from fuel 26 that is being supplied from the upstream fuel reservoir 12 to the downstream internal combustion engine 14. The device 24 has a housing 28 that is configured to couple with the fuel reservoir 12. Various means for coupling the housing 28 to the fuel reservoir 12 can be employed. In the example shown, the housing 28 has a base flanged surface 30 receiving screws 32 that fix the housing 28 to the fuel reservoir 12. At least one seal 29 is sandwiched between the surface 30 and reservoir 12, providing a fluid-tight seal. The housing 28 has an inlet 34 receiving the fuel 26, which typically contains water and contaminants. In the example shown, the inlet 34 is connected to a screen 36 for filtering particulate matter from the mixture of fuel, water and contaminants, according to known arrangements. The type and configuration of screen 36 can vary from that shown. The screen 36 is an optional item and the device 24 can function properly without using the screen 36.

Figure 6:
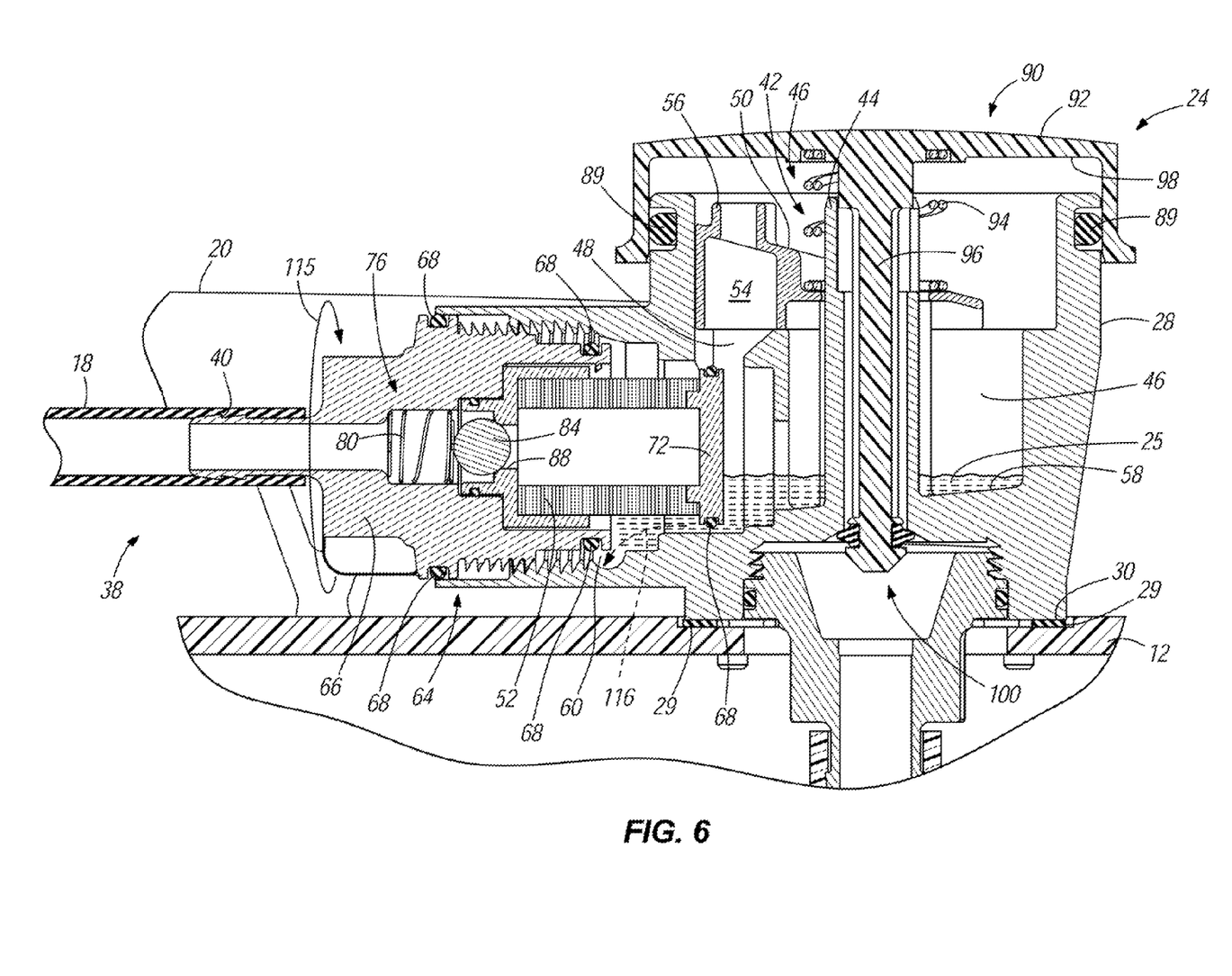
FIG. 6 is a sectional view of the device for separating water and contaminants from fuel.

Referring to FIG. 6, the housing 28 includes an outlet 38 discharging the fuel 26 to the downstream fuel hose 18, pump 16 and internal combustion engine 14. The fuel hose 18 is connected to the outlet 38 by a barbed connection 40 providing a liquid seal therebetween. Other types of connections can be employed instead of or in addition to the barbed connection 40.

The device 24 also includes a gravity separator 42 disposed in the housing 28 between the inlet 34 and outlet 38. The gravity separator 42 separates water 25 from the fuel 26 as the fuel 26 flows from the inlet 34 to the outlet 38. In the example shown, the gravity separator 42 includes a baffle 44 disposed between a water cavity 46 and a fuel cavity 48. The water cavity 46 holds water separated from the fuel 26 and the fuel cavity 48 supplies the fuel to the outlet 38. In this arrangement, the baffle 44 is disposed between the water cavity 46 and fuel cavity 48 such that as fuel 26 passes over the baffle 44 from upstream to downstream, the fuel 26 and water 25 separate by gravity, as will be discussed further herein below, such that the water 25 remains in the water cavity 46 as the fuel passes over the baffle 44. At least a portion of the housing 28 is optionally translucent (e.g. opaque) for viewing the water in the water cavity 46, as will be discussed further herein below.

The device 24 further includes a filter 52 disposed in the housing 28 between the inlet 34 and outlet 38. The filter 52 is configured to filter contaminants from the fuel 26 flowing from upstream to downstream. In this example, the filter 52 comprises a pleated filter media. Other types of filter configurations can be employed.

Figure 7:
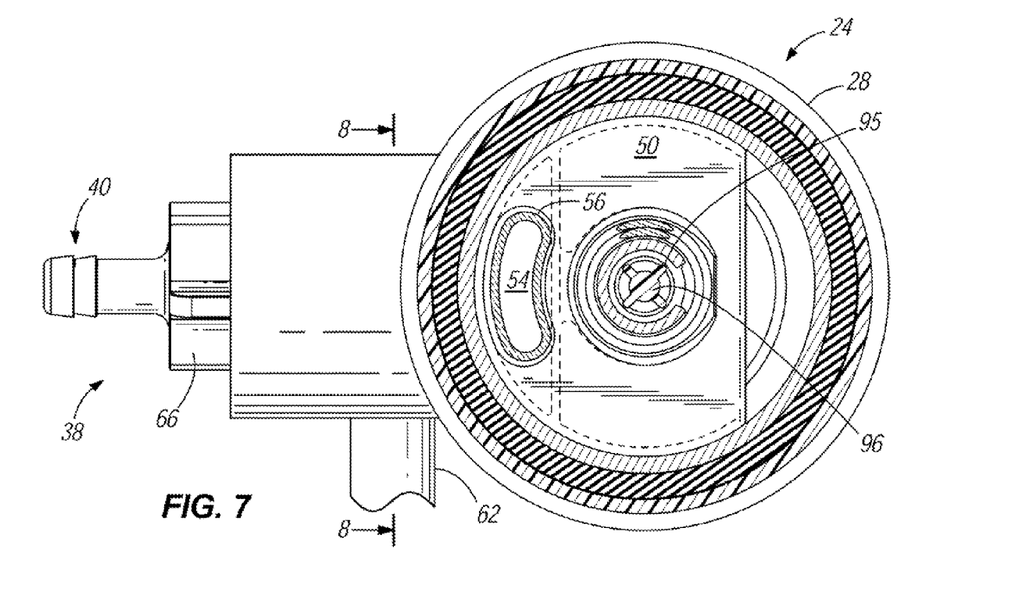
FIG. 7 is a view of section 7-7 taken in FIG. 3.
Figure 8:
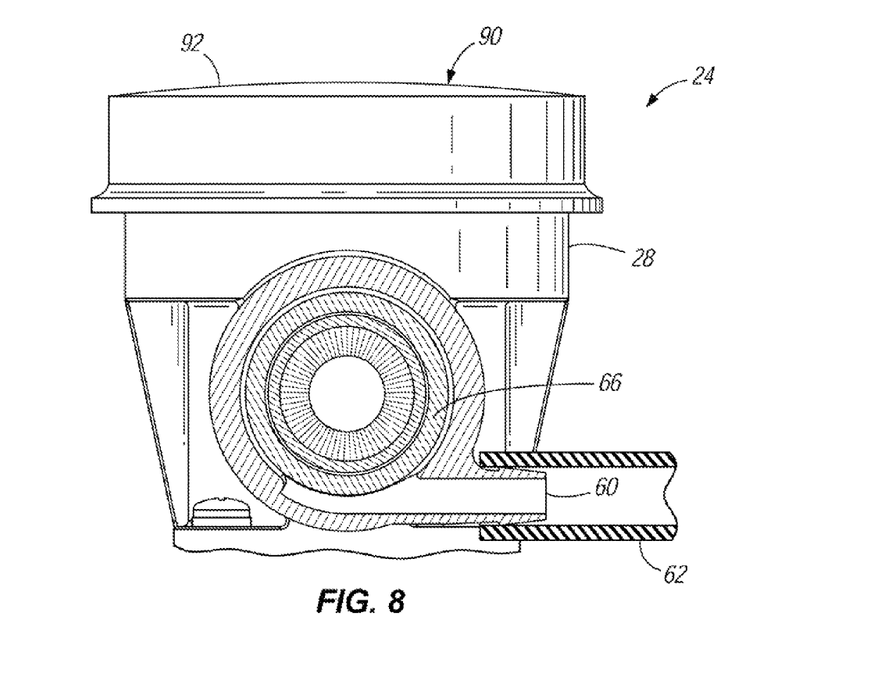
FIG. 8 is a view of section 8-8 taken in FIG. 7.

As best shown in FIGS. 3 and 7, the housing 28 includes an inclined surface 50 disposed downstream of the gravity separator 42 and upstream of the filter 52. The inclined surface 50 defines a passageway 54 through which fuel 26 drains to the filter 52. The inclined surface 50 defines a raised perimeter 56 around the passageway 54 which effectively provides a secondary baffle over which the fuel 26 must flow to enter into the fuel cavity 48. Thus, the inclined surface 50 provides another separator, secondary to the baffle 44.

As shown in FIGS. 3 and 6, the water cavity 46 in the housing 28 has a sloped floor 58 draining water 25 that has been separated from the fuel towards a drain 60 discharging water 25 from the water cavity 46 and from the device 24. As shown in FIG. 2, water 25 discharges from the device 24 via gravity through a discharge hose 62 connected to the drain 60. A valve 64 is movable between a sealed position shown in FIG. 3, which closes the drain 60, and an unsealed position shown in FIG. 6, which opens the drain 60. In the example shown, the valve 64 includes a fitting 66 that coextends with the outlet 38 and has seals 68 sealing between the fitting and the housing 28. The fitting 66 is attached to the housing 28 by a threaded connection 70. Threading the connection 70 presses the seals 68 between the fitting 66 and housing 28 to prevent fluid flow through the drain 60, thus closing the drain 60. Unthreading the connection 70 unseals the seals 68 so as to allow flow of fluid through the drain 60, thus opening the drain 60. In the example shown, the filter 52 is attached to and travels with the fitting 66 during movement between the sealed and unsealed positions. The seals 68 are positioned between the fitting 66 and the housing 28, as well as between an end cap 72 on the filter 52 and the housing 28.

As shown in FIG. 3, an inlet valve 74 is biased into a closed position on the inlet 34. An outlet valve 76 is biased into a closed position on the outlet 38. Both of the inlet and outlet valves 74, 76 include springs 78, 80 biasing sealing balls 82, 84 against seats 86, 88. Inlet and outlet valves 74, 76 open and close according to the pressure inside of the housing with respect to the pressures outside of the inlet 34 and outlet 38, respectively, as will be further discussed herein below.

The device 24 also includes a primer 90 priming fuel for consumption by the internal combustion engine 14. In the example shown, the primer 90 includes a resilient rubber cap 92 that is biased into an extended position, as shown in FIG. 3, by a spring 94 and connected to the housing 28 in a fluid-tight relationship by seals 89. As discussed further herein below, manually pressing the cap 92 out of the extended position shown in FIG. 3 primes fuel 26 from the reservoir 12 for consumption by the internal combustion engine 14. A stem 96 having a plurality of flutes 95 (see FIG. 7) disposed therearound, is coupled to the inner surface 98 of the cap 92. The lower end of the stem 96 includes a fuel demand valve 100 maintaining a sealed condition of the fuel reservoir 12 and being responsive to changes in pressure within a preselected location of the fuel system 10 relative to atmospheric pressure, as disclosed in incorporated U.S. patent application Ser. No. 12/499,545. Further explanation of the structure and function of the fuel demand valve 100 is not included herein for brevity sake. Pressing the cap 92 out of the extended position, shown in FIG. 3, raises the pressure in the housing 28 and thus opens the outlet valve 76 and allows fuel 26 flow to the internal combustion engine 14. Releasing the cap 92 allows the spring 94 to bias the cap 92 outwardly which causes suction in the housing 28 that closes the outlet valve 76 and opens the inlet valve 74 so as to pull fuel from the reservoir 12 into the housing 28, as will be discussed further herein below.

FIG. 3 depicts the device 24 when the fuel supply system 10 is not operating, i.e. when the internal combustion engine 14 is not running and the pump 16 is not drawing fuel 26 from the reservoir 12. As shown in FIG. 3, the springs 78, 80 bias the sealing balls 82, 84 against the seats 86, 88 to close the inlet and outlet valves 74, 76, respectively. The spring 94 biases against the inner surface 98 of the cap 92 to draw the stem 96 upwardly, thus closing the fuel demand valve 100 by sealing the seals 102 against the seat 104 in housing 28. In this configuration, fuel 26 remains in the reservoir 12 and is not drawn up through the screen 36.

Figure 4:
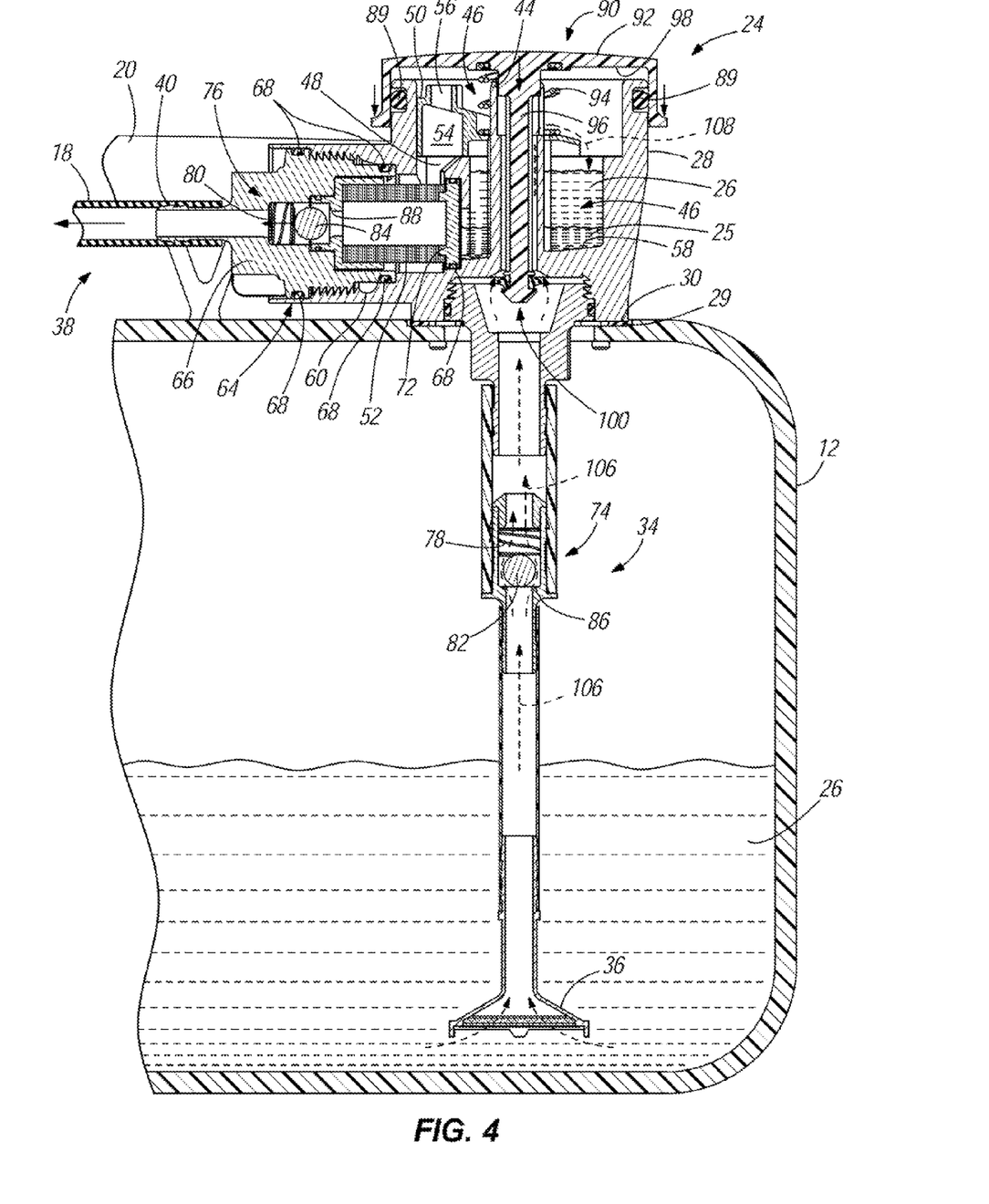
FIG. 4 is another view like FIG. 2 showing fuel being supplied from the upstream fuel reservoir to a device for separating water and contaminants from the fuel.
Figure 5:
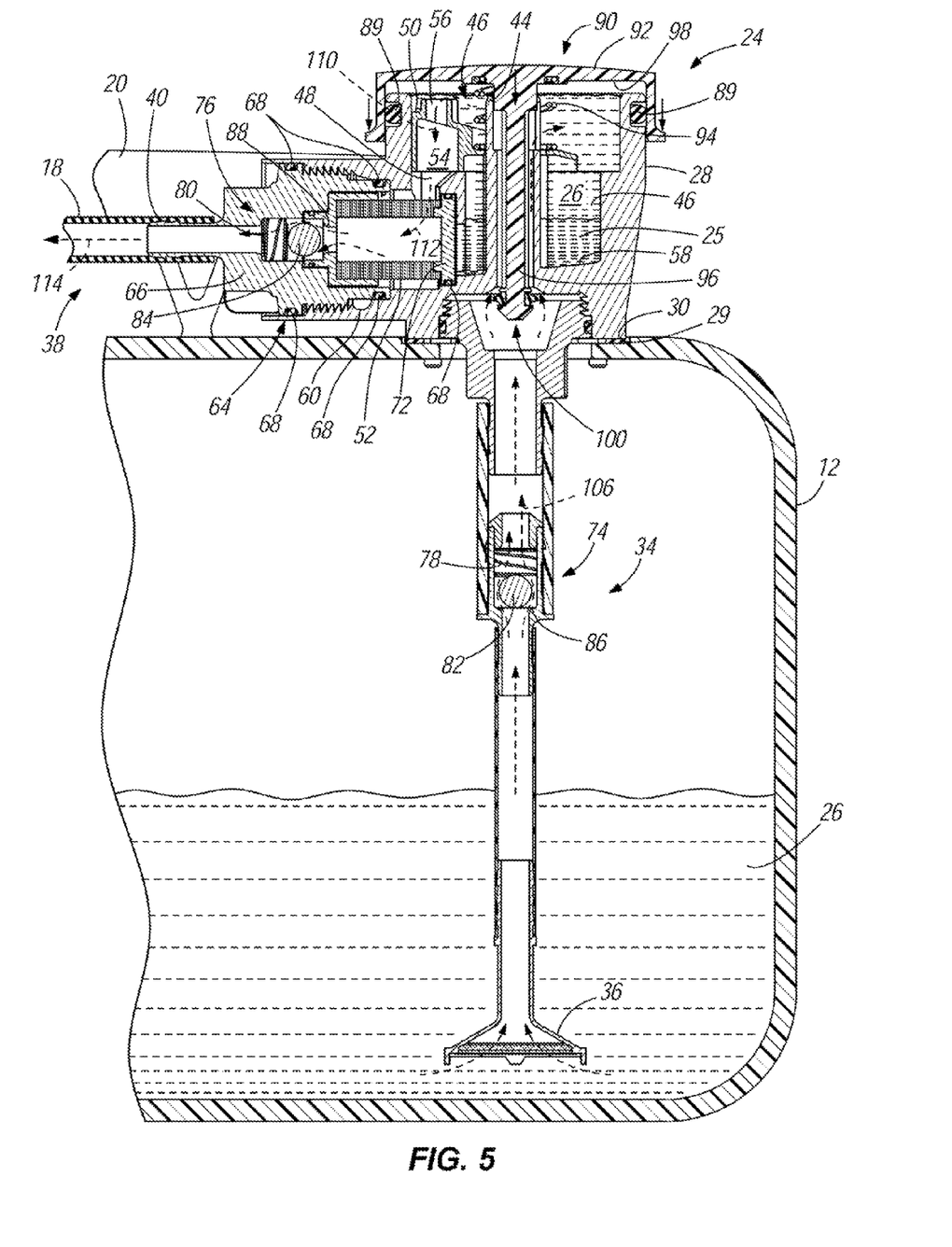
FIG. 5 is another view like FIG. 2, showing fuel being supplied from the upstream fuel reservoir to a downstream internal combustion engine via the device.

FIG. 4 depicts the device 24 when the system 10 is operational and the pump 16 is creating suction in the fuel hose 18 to draw fuel 26 through the device 24. Specifically, the suction in the fuel hose 18 draws the sealing ball 84 of the outlet valve 76 against the bias of spring 80, thus unseating the sealing ball 84 from the seat 88. The suction from the pump 76 also draws the inner surface 98 of the cap 92 downwardly against the bias of spring 94 to thus unseat the seal 102 of fuel demand valve 100. The suction further draws the sealing ball 82 upwardly against the bias of spring 78 to unseat the sealing ball 82 from the seat 86, thus opening the inlet valve 74 and allowing flow of fuel through the device 24. Specifically, fuel 26 is drawn through screen 36, wherein particulate matter is filtered and remains in the fuel reservoir 12. Fuel continues upwardly through the inlet 34 at arrows 106, past the inlet valve 74 and the fuel demand valve 100 and into the housing 28, as shown at arrows 108. Upon entry into the housing 28, the fuel 26, which typically carries both water and contaminants, enters the water cavity 46 wherein water 25 settles out of the fuel 26 via gravity such that fuel 26 resides on top of the water 25 and is separated from the water 25 by passage over the baffle 44. Any water 25 that is carried with the fuel over the baffle 44 is again settled from the fuel 26 before passage over the raised perimeter 56 of the inclined surface 50. The water 25 that settles from the fuel 26 drains down off of the inclined surface 50 into the water cavity 46. As shown in FIG. 5, fuel 26 flows downwardly through the passageway 54 in the inclined surface 50 for filtration by filter 52, as shown at arrows 110 and 112. Contaminants are thus removed from the fuel 26 by the filter 52 which is allowed to pass through the outlet 38, and specifically through the outlet valve 76 into the fuel hose 18, as shown at arrows 114.

As shown in FIG. 6, the housing 28 can have at least one transparent portion adjacent the water cavity 46 for viewing the amount of water 25 contained therein. When the water cavity 46 is filled with water 25, the valve 64 can be opened via the threaded connection, as shown at arrow 115, to open the drain 60 and drain water from the housing 28 through the discharge hose 62, as shown at arrow 116. Thereafter, the fitting 66 can be threaded back onto the housing 28 to close the valve 64 and allow subsequent operation of the device 24.

Figure 9:
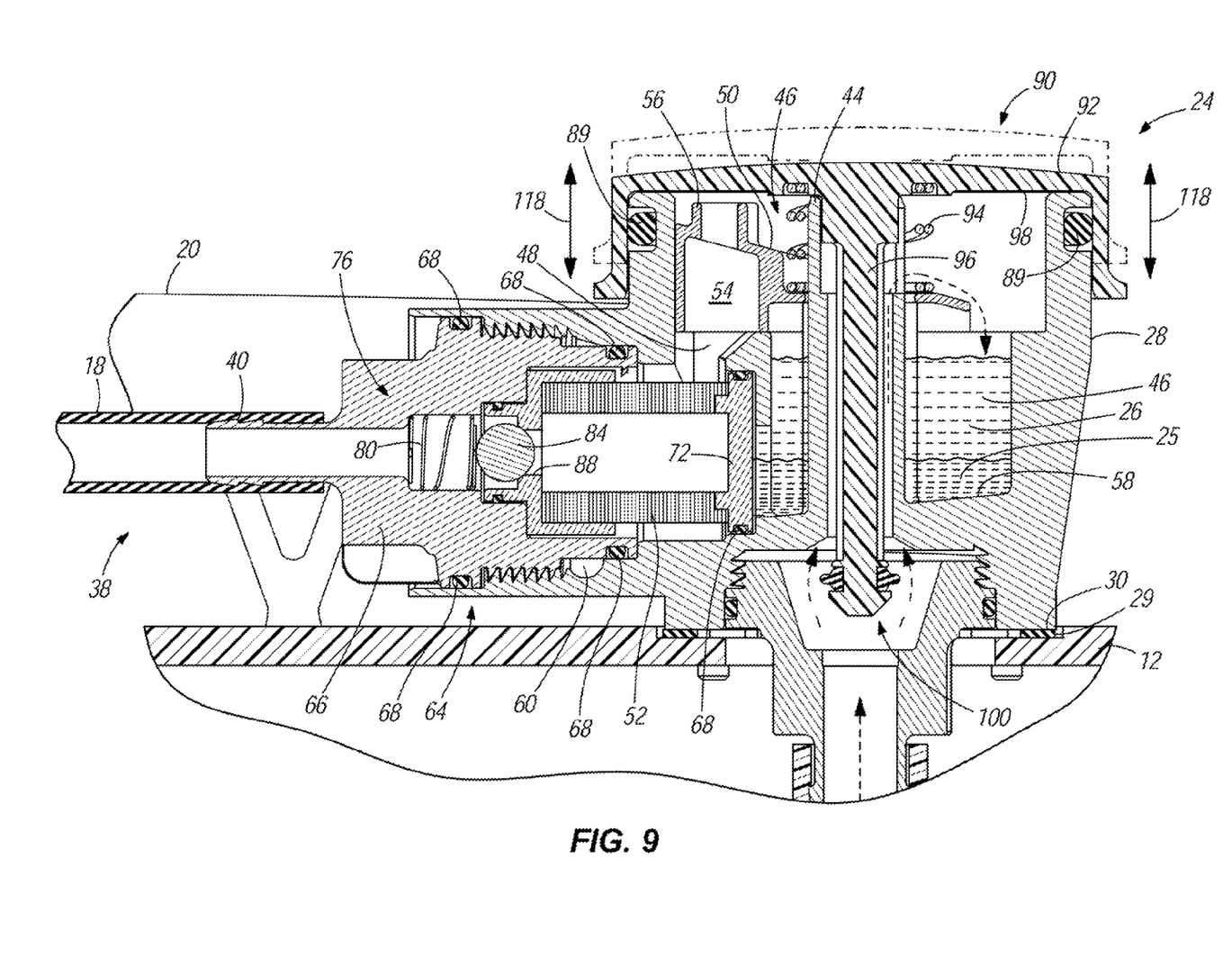
FIG. 9 is a view like FIG. 6 showing operation of a primer priming fuel for consumption by the internal combustion engine.

FIG. 9 shows operation of the primer 90. The primer 90 is manually compressed downwardly, as shown at arrows 118, thereby compressing the spring 94 and opening the fuel demand valve 100. Simultaneously, the increased pressure in housing 28 forces sealing ball 84 radially outwardly against the spring 80 to open the outlet valve 76 and allows fuel 26 flow therethrough. Releasing the cap 92 allows the spring 94 to bias the cap 92 upwardly, which creates suction in the housing 28, opens the inlet valve 74 and draws fuel 26 upwardly into the housing 28. Repeating this motion fills the housing 28 with fuel for separation and filtering according to the operations discussed above. Priming can be undertaken prior to operation of the pump 16 and internal combustion engine 14 according to the operations discussed above.

What is claimed is:

1. A device for separating water and contaminants from fuel that is being supplied from an upstream fuel reservoir to a downstream internal combustion engine, the device comprising:
   a housing that couples with the fuel reservoir, the housing having an inlet receiving fuel, water and contaminants, and an outlet discharging the fuel;
   a gravity separator disposed in the housing between the inlet and the outlet, the gravity separator separating the water from the fuel;
   wherein the housing comprises a water cavity holding the water separated from the fuel and a fuel cavity supplying the fuel to the outlet;
   a filter disposed in the housing between the inlet and the outlet, the filter filtering the contaminants from the fuel;
   a primer priming fuel for consumption by the internal combustion engine, the primer comprising a cap that is biased into an extended position, wherein pressing the cap out of the extended position primes fuel from the reservoir for consumption by the internal combustion engine; and
   an outlet valve that is biased into a closed position on the outlet and an inlet valve that is biased into a closed position on the inlet, wherein pressing the cap out of the extended position opens the outlet valve and supplies fuel, to the internal combustion engine and wherein releasing the cap closes the outlet valve and opens the inlet valve so as to prime fuel from the reservoir into the housing.

2. The device according to claim 1, comprising a stem coupled to the cap, the stem carrying a fuel demand valve that maintains as sealed condition of the fuel reservoir and is responsive to changes in pressure within the fuel system relative to atmospheric pressure.

3. The device according to claim 2, comprising a spring on the stem, the spring biasing the cap into the extended position.

4. The device according to claim 3, wherein the fuel demand valve is located in the housing, downstream of the inlet valve and upstream of the outlet valve.

5. The device according to claim 4, wherein the fuel demand valve seals with the housing when the cap is in the extended position and wherein the fuel demand valve does not seal with the housing and fluid flows past the fuel demand valve to the gravity separator when the cap is out of the extended position.

6. The device according to claim 5, wherein the stem comprises at least one flute allowing flow of fluid therepast when the aid demand valve is not sealed with the housing.

7. The device according to claim 2, wherein the housing comprises an inclined surface disposed downstream of the gravity separator and upstream of the filter, the inclined surface defining a passageway through which fuel drains to the filter; wherein the stem extends through the inclined surface.

8. The device according to claim 7, wherein the gravity separator comprises a baffle disposed between the water cavity and the fuel cavity such that as the fuel passes over the baffle from upstream to downstream the fuel and water separate by gravity.

9. The device according to claim 2, wherein the water cavity comprises a sloped floor draining water towards a drain and wherein the stem passes through the sloped floor.

10. A fuel supply system comprising:
    a fuel reservoir containing fuel;
    an internal combustion engine consuming fuel from the fuel reservoir;
    a device attached to the fuel reservoir and separating water and contaminants from the fuel, the device comprising a housing, having an inlet receiving fuel and an outlet discharging the fuel;
    a gravity separator disposed in the housing between the inlet and the outlet, the gravity separator separating water from the fuel;
    a filter disposed in the housing between the inlet and the outlet, the filter filtering contaminants from the fuel;
    a primer priming fuel from the fuel reservoir to the internal combustion engine; wherein the primer comprising a cap that is biased into an extended position, and wherein pressing the cap out of the extended position primes fuel from the reservoir for consumption by the internal combustion engine; and
    an outlet valve that is biased into a closed position on the outlet and an inlet valve that is biased into a closed position on the inlet, wherein pressing, the cap out of the extended position opens the outlet valve and supplies fuel to the internal combustion engine and wherein releasing the cap closes the outlet valve and opens the inlet valve so as to prime fuel, from the reservoir into the housing.

11. A fuel supply system comprising:
an upstream fuel reservoir for containing fuel;
a downstream internal combustion engine that consumes fuel from the fuel reservoir;
a device that separates water and contaminants from the fuel, the device disposed upstream of the internal combustion engine and downstream of the fuel reservoir, the device comprising a housing that is attached to the fuel reservoir, the housing having an inlet receiving the fuel from the fuel reservoir and an outlet discharging, the fuel, to the internal combustion engine;
a seal that provides a fluid-tight seal between an outer surface of the housing and the fuel reservoir;
a gravity separator disposed in the housing between the inlet and the outlet, the gravity separator separating water from the fuel;
a filter disposed in the housing between the gravity separator and the outlet, the filter filtering, contaminants from the fuel;
a primer priming fuel from the fuel reservoir to the internal combustion engine; wherein the primer comprises a cap that is biased into an extended position, and wherein pressing the cap out of the extended position primes fuel from the reservoir for consumption by the internal combustion engine; and
an outlet valve that is biased into a closed position on the outlet and an inlet valve that is biased into a closed position on the inlet, wherein pressing the cap out of the extended position opens the outlet valve and supplies fuel to the internal combustion engine and wherein releasing the cap closes the outlet valve and opens the inlet valve so as to prime fuel from the reservoir into the housing.

12. The fuel supply system according to claim 11, wherein the housing comprises a flanged surface that receives screws that fix the housing to the fuel reservoir.

13. The fuel supply system according to claim 11, comprising a screen that is connected to the inlet for filtering particulate matter from the fuel, wherein the screen is disposed in the fuel reservoir.

14. The fuel supply system according to claim 11, wherein the inlet valve comprises a ball valve that is biased into the closed position by a spring, wherein the suction pressure created in the housing by the internal combustion engine overcomes the bias of the spring.

15. The fuel supply system according to claim 11, comprising a fuel demand valve disposed downstream of the inlet valve and upstream of the gravity separator, the fuel demand valve being biased into a closed position, wherein the fuel demand valve opens under suction pressure created in the housing, by the internal combustion engine.

16. The fuel supply system according to claim 15, comprising a spring that biases the fuel demand valve into the closed position, wherein the suction pressure created in the housing by the internal combustion engine overcomes the bias of the spring to move the fuel demand valve into an open position.

17. The fuel supply system according to claim 11, wherein the housing comprises:
a water cavity holding the water separated from the fuel;
a fuel cavity supplying the fuel to the outlet;
wherein the gravity separator comprises a primary baffle disposed between the water cavity and the fuel cavity such that as the fuel passes over the baffle from upstream to downstream the fuel and water separate by gravity;
wherein the gravity separator comprises a secondary baffle formed by an inclined surface disposed downstream of the gravity separator and upstream of the filter, the inclined surface defining a passageway through which fuel drains to the filter;
wherein the primer comprises a stem that extends through the inclined surface.

18. The fuel supply system according to claim 11, comprising a drain discharging water from the water cavity, wherein the water cavity comprises a sloped floor draining water towards the dram; wherein the primer comprises a stem that extends through the sloped floor.

19. The fuel supply system according to claim 18, comprising a valve that is movable between a sealed position that closes the drain and an unsealed position that opens the drain;
wherein the valve comprises a fitting that coextends with the outlet and further comprises at least one seal sealing between the fitting and the housing, wherein the fitting comprises a threaded connection, and wherein threading the connection presses the at least one seal between the fitting and the housing to close the drain and wherein unthreading the connection unseals the at least one seal so as to open the drain.

20. The fuel supply system according to claim 19, wherein the filter is coupled to the fitting and the seal is coupled to the filter.

* * * * *